Dec. 13, 1949     O. R. SCHOENROCK     2,491,283
SHORT WHEEL BASE TRACTOR
Filed Sept. 14, 1945     4 Sheets-Sheet 4
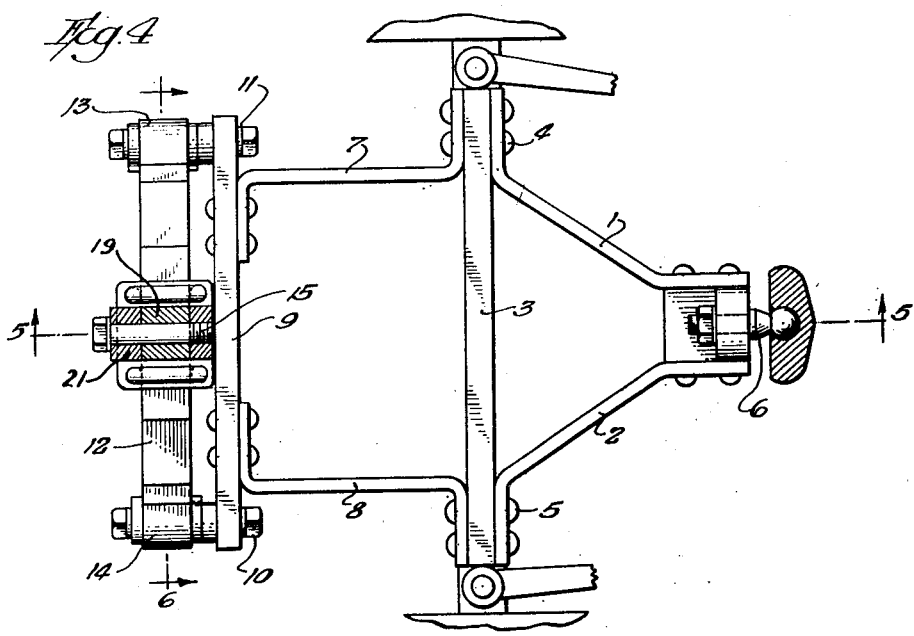
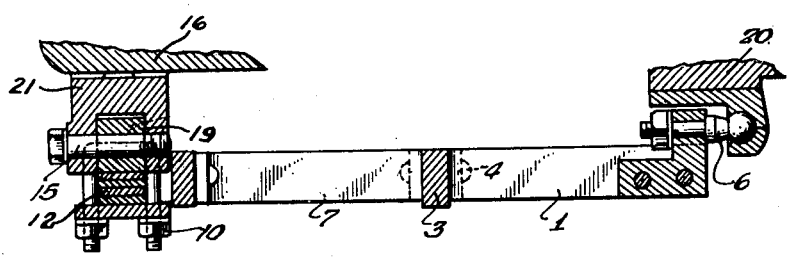
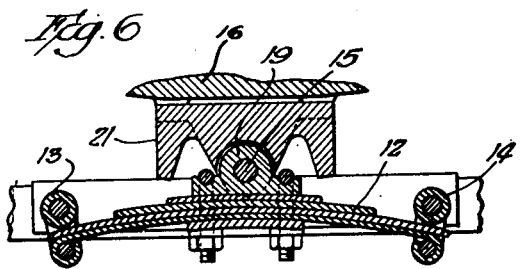
Inventor:
Otto R. Schoenrock Patented Dec. 13, 1949

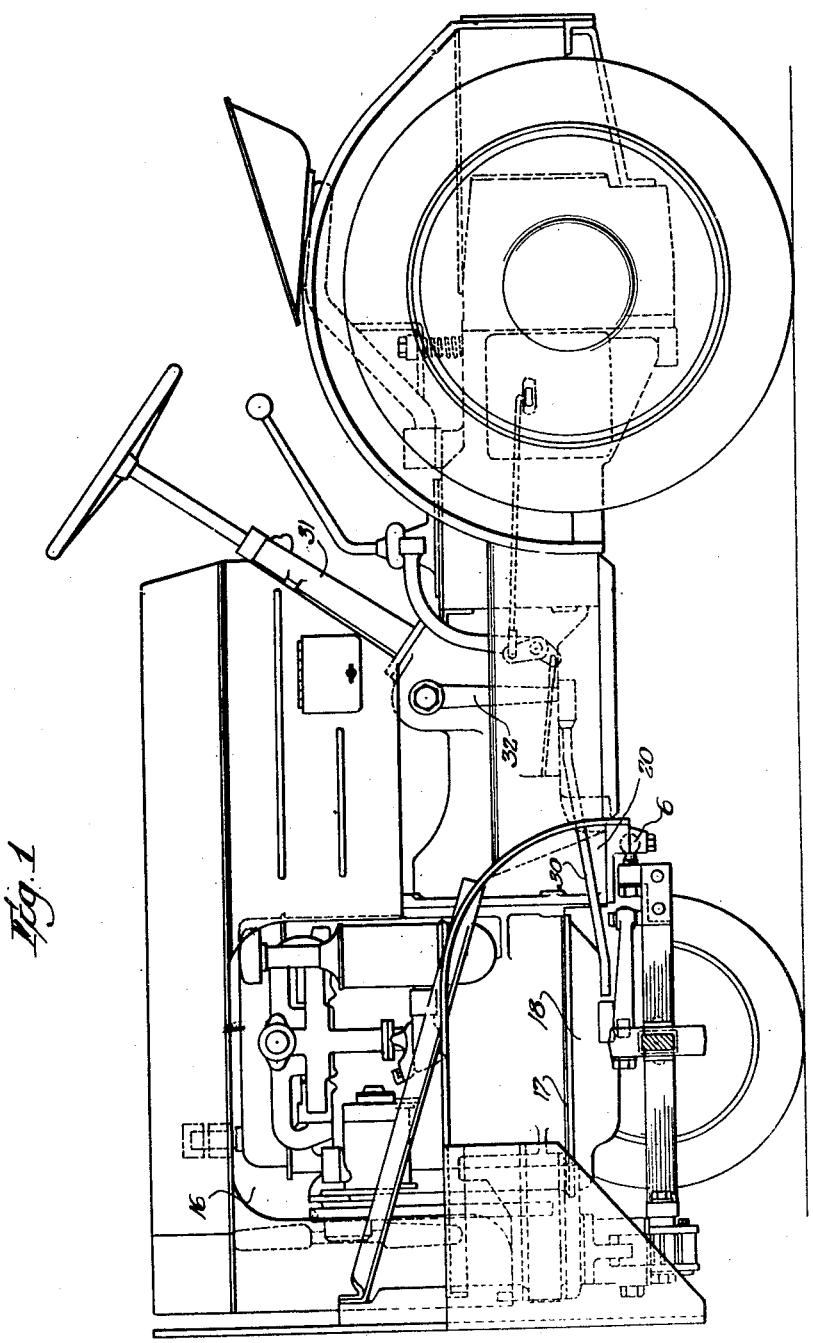

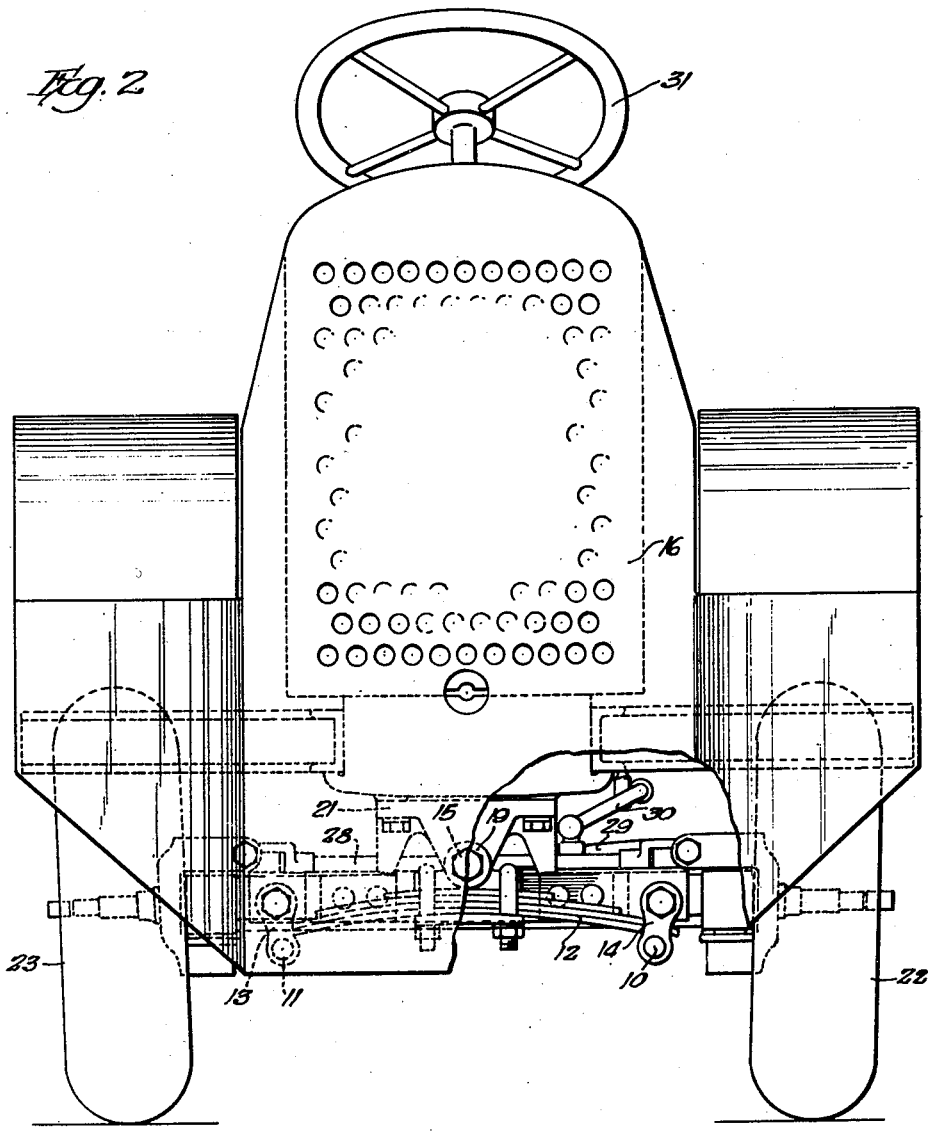

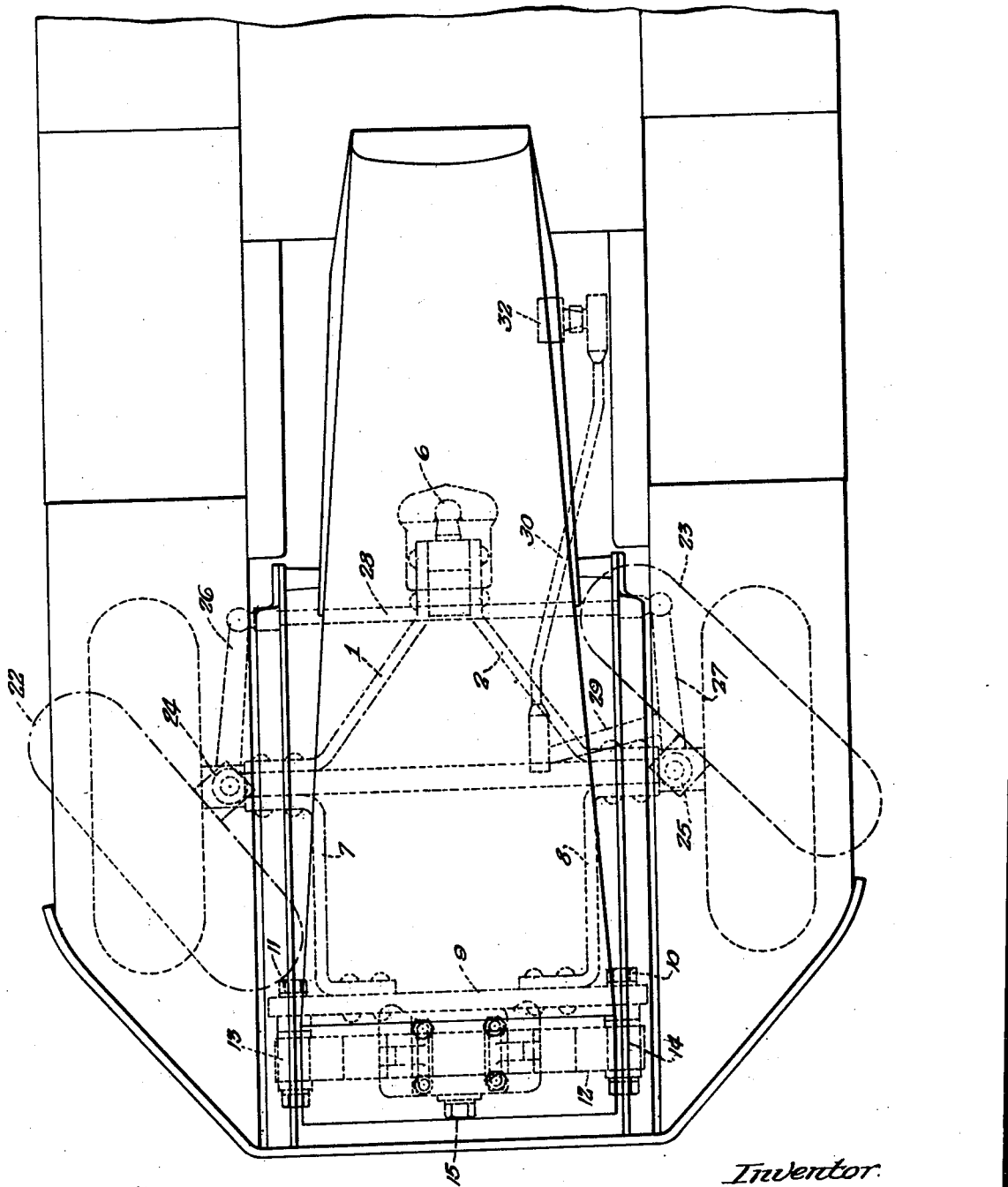

2,491,283

UNITED STATES PATENT OFFICE 2,491,283

SHORT WHEEL BASE TRACTOR

Otto R. Schoenrock, Oak Park, Ill., assignor to J. I. Case Company, Racine, Wis., a corporation of Wisconsin Application September 14, 1945, Serial No. 616,324

6 Claims. (Cl. 180—54)

This invention relates to short wheel base tractors. Small tractors are being extensively used in industrial plants for towing trucks loaded with material from one point of the plant to another. A necessary requisite for tractors of this type is that they should be able to turn in a very small radius and should have sufficient weight on the front wheels so that the tractor will stay on the ground and will not rear-up when a heavy load is being pulled.

One of the objects of my invention is to provide an improved axle structure whereby a short wheel base is obtained which enables turning in a small radius.

Another object of my invention is to have the front axle mounted in a manner which does not interfere with the mounting of an oil pan at the bottom of the tractor engine.

Further objects and advantages of my invention will be apparent from the description and the claims.

I am able to shorten the wheel base by placing the front wheel axle under the engine instead of at the extreme front of the tractor body. By means of the use of a separate frame spaced below the engine, and by attaching the front end of this frame to the tractor engine by means of a spring, and attaching the rear end of the separate frame to the torque tube by means of a universal joint, I obtain a combination wherein the weight of the tractor is mounted on springs. This creates a front weighted tractor structure which is not too rigid and gives a smoother riding effect. By having the separate frame attached at the front to a spring and attached at the rear to a universal joint pivoted to the torque tube, the entire frame, together with the front axle mounted in the middle of the frame, is in a non-rigid suspended form.

Referring now to the drawings,

Fig. 1 is a side elevational view of the tractor;

Fig. 2 is a front elevational view;

Fig. 3 is a plan view;

Fig. 4 is a plan view of the front axle and associated parts;

Fig. 5 is a section on the line 5—5 of Fig. 4; and

Fig. 6 is a section on the line 6—6 of Fig. 4.

Referring to Fig. 4, the separate frame consists of two frame members 1 and 2 which are attached to the axle 3 by means of rivets 4 and 5, and which extend rearwardly in a converging direction to the knuckle of the universal joint 6. This connects the frame to the torque tube 20. Extending from the other side of the axle 3 and attached thereto by the same rivets 4 and 5 are the frame members 7 and 8 which are rigidly attached to a transverse frame member 9. At each end of the transverse frame member 9 are the shackle bolts 10 and 11. These shackle bolts are attached to the leaf spring 12 by means of the shackles 13 and 14. The engine 16 is rockably secured to the middle portion of the spring 12 by means of a pin 15 extending through registering openings in the brackets 19 and 21 secured to the spring 12 and engine 16, respectively. As shown in Fig. 1 the rear end of the engine 16 is secured to the torque tube 20. The front axle 3 is located at a point about midway between the length of the engine. The distance between the frame and the lower part of the engine at 17 is sufficient to allow the mounting of an oil pan 18 below the engine and between the engine bottom and the front wheel axle 3. The wheel base or distance between the front and rear axle is about 54½ inches, and the distance between the front axle and the front end of the tractor is about 20 inches. The diameter of the front wheel is 19 inches.

Fig. 3 shows that the front wheels 22 and 23 can be turned to an extreme angle without coming in contact with any part of the special frame. This is made possible by the front wheels' swivel connections at 24 and 25 consisting of steering knuckles, each having a steering knuckle arm 26 and 27. The ends of these two arms are connected by the steering knuckle tie rod 28 which in turn is connected to the steering arm 29 which connects with the drag link 30 that connects to the steering gear 31 by means of steering arm 32.

From the above description of my invention it will be apparent that the features involved are the use of a separate frame spaced below the engine and having the front wheels attached to it so that these front wheels can be spaced as close to the rear wheels as possible, attaching the front end of the frame to the tractor by means of a spring so that the weight of the tractor will be mounted on springs, spacing the front axle as well as the horizontal position of the frame a sufficient distance below the engine to allow the mounting of an oil pan, and having swivelled front wheel axle ends to enable sharp angle turns.

While I have disclosed specific means for carrying out my invention, I do not necessarily limit myself to the particular methods disclosed. Thus in place of the leaf spring, any type of suitable spring may be used to attach the special frame to the engine. In place of the universal joint connecting the rear part of the special frame to the torque tube, any other suitable type of connecting means may be used. The rear connection need not necessarily be to the torque tube, but may be attached at some other suitable point. The rivets 4 and 5, attaching frame members 1 and 2 to axle 5 may be supplemented by welding if desired.

Further modifications will be apparent to those skilled in the art and it is desired, therefore, that the invention be limited only by the scope of the appended claims.

Having thus described my invention, what I claim and desire to secure by Letters Patent is:

1. In a motor vehicle having front and rear wheels and an engine; a front axle extending underneath the engine, a torque tube extending between said engine and rear wheels and secured to said engine, a frame structure on which the axle is mounted extending both forwardly and rearwardly from said axle, said rearward extension having a universal joint connection having its center fixed with respect to said torque tube adjacent the lower rear end of said engine, and spring means connecting said forward extension with said engine.

2. In a motor vehicle having front and rear wheels and an engine; a front axle extending underneath the engine, a torque tube extending between said engine and rear wheels and secured to said engine, a frame structure on which the axle is mounted extending both forwardly and rearwardly from said axle, said rearward extension having a universal joint connection having its center fixed with respect to said torque tube adjacent the lower rear end of said engine, and spring means connecting said forward extension with said engine, said spring connection comprising a leaf spring extending transversely with respect to the vehicle having its ends connected to said forward extension and having its medial portion connected with respect to said engine.

3. In a motor vehicle having front and rear wheels and an engine; a front axle extending underneath the engine, a torque tube extending between said engine and rear wheels and secured to said engine, a frame structure on which the axle is mounted, said frame structure extending both forwardly and rearwardly from said axle, an oil pan mounted to said engine and spaced between said engine and said frame structure, said rearward extension having a universal joint connection having its center fixed with respect to said torque tube adjacent the lower rear end of said engine, and spring means connecting said forward extension with said engine.

4. In a motor vehicle having front and rear wheels and a torque tube extending from said rear wheels and joined to an engine; a front axle extending underneath the engine, a frame structure on which the axle is mounted extending both forwardly and rearwardly from said axle, said frame structure consisting of two frame members extending respectively from each axle and rearwardly in a converging direction to a universal joint which pivots said frame members to the torque tube, and two end frame members mounted parallel to the torque tube and rigidly attached to a transverse frame member shackled to a transverse leaf spring, said leaf spring having its medial portion connected to said engine.

5. In a tractor having a short wheel base, the combination comprising front and rear wheels, an engine, a front axle extending underneath the engine, a torque tube extending between said engine and rear wheels and secured to said engine, a frame structure to which said front axle is mounted, said frame structure extending both forwardly and rearwardly from said axle, said rearward extension having a universal joint connection with respect to said torque tube adjacent the lower rear end of said engine, and spring means connecting said forward extension with said engine.

6. A short wheel base tractor having front and rear wheels, front axle means, the axis of which extends underneath said engine intermediate the ends thereof, a torque tube extending between said engine and rear wheels and secured to said engine, a frame structure on which said axle means are mounted extending both forwardly and rearwardly from said axis, one of said extensions having a universal joint connection having its center fixed with respect to said torque tube adjacent a lower end portion of said engine, and spring means connecting the other extension with the lower other end portion of said engine.

OTTO R. SCHOENROCK.

REFERENCES CITED

The following references are of record in the file of this patent:

UNITED STATES PATENTS

| Number | Name | Date |
|---|---|---|
| 1,397,755 | Deckert | Nov. 22, 1921 |
| 1,560,176 | Hawkins et al. | Nov. 3, 1925 |

FOREIGN PATENTS

| Number | Country | Date |
|---|---|---|
| 325,536 | Great Britain | Feb. 20, 1930 |
| 615,097 | France | Oct. 2, 1926 |